Feb. 21, 1967 E. O. SHEPARD ETAL 3,305,758
MAGNETICALLY REGULATED POWER SUPPLY
Filed July 12, 1963 3 Sheets-Sheet 1

ERROR SIGNAL

WITNESSES
Theodore F. Wrobel
Donald R. Lackey

INVENTORS
Sheldon D. Silliman, John F. Reuther
and Emor O. Shepard
BY
F. E. Browder
ATTORNEY

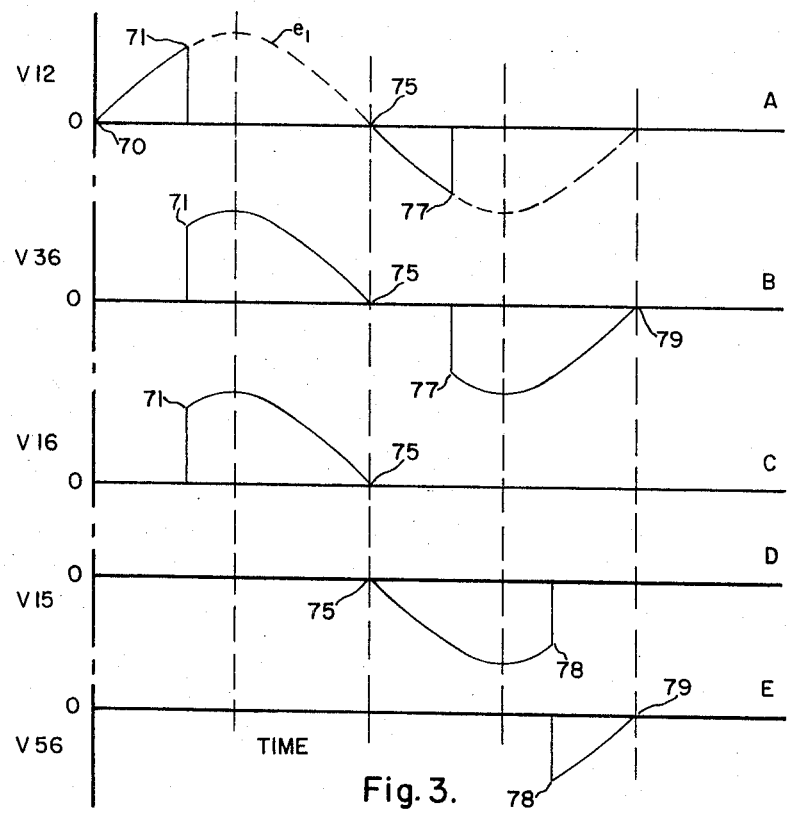
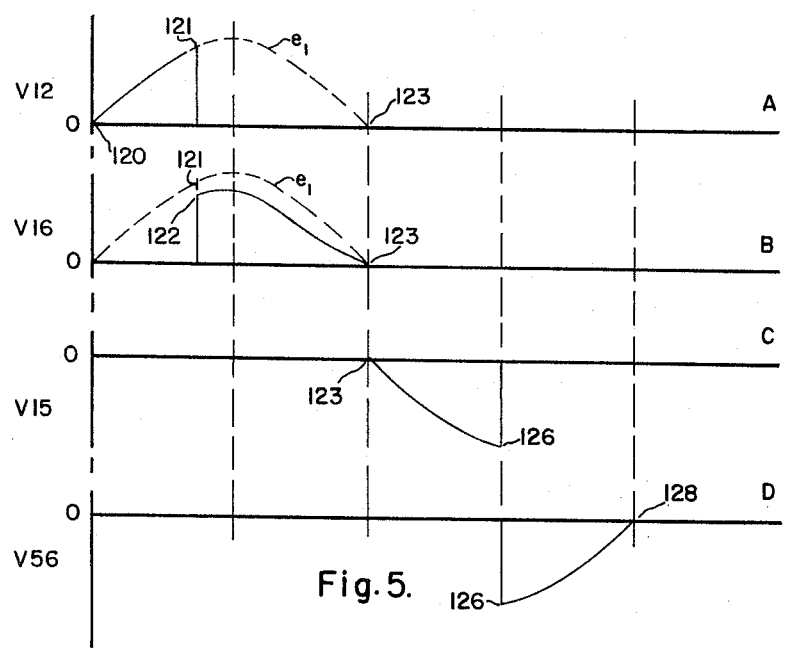

United States Patent Office 3,305,758
Patented Feb. 21, 1967

3,305,758
MAGNETICALLY REGULATED POWER SUPPLY
Emor O. Shepard, Wilkins Township, Allegheny County, John F. Reuther, Penn Hills Township, Allegheny County, and Sheldon D. Silliman, Forest Hills, Pa., assignors to Westinghouse Electric Corporation, East Pittsburgh, Pa., a corporation of Pennsylvania
Filed July 12, 1963, Ser. No. 294,708
7 Claims. (Cl. 321—18)

This invention relates in general to electrical control apparatus and, more particularly, to regulated power supply systems.

It is an object of this invention to provide a new and improved regulated power supply.

Another object of this invention is to provide a new and improved power supply which will provide a substantially constant unidirectional output voltage.

A further object of this invention is to provide a new and improved power supply in which the output is independent of voltage variations in the alternating current source.

It is a further object of this invention to provide an improved regulated power supply comprising static components.

Another object of this invention is to provide a regulated unidirectional output voltage, in phase with the input voltage, which may be utilized directly, or as a signal controlling higher output devices.

Briefly, the present invention accomplishes the above cited objects by providing an arrangement of magnetic means or magnetic saturable core reactors, whereby the volt-second saturation characteristic of one saturable core reactor at the start of a voltage half cycle determines the magnitude of the output voltage. A second saturable core reactor then produces the output voltage at the end of the next voltage half cycle which consists of portions of a sine wave, in phase with the input voltage, starting during a half cycle and ending at an input voltage zero. In other words, a constant volt-second area is produced at the start of a voltage half cycle and transferred to the end of the next voltage half cycle. This unidirectional output voltage may be used directly, or, since the output has a steep wave front starting a predetermined and controlled time ahead of the input voltage zero, greater power output may be obtained by using the start of the output to fire or trigger other devices, such as silicon controlled rectifiers.

Further objects and advantages of the invention will become apparent as the following description proceeds and features of novelty which characterize the invention will be pointed out in particularity in the claims annexed to and forming a part of this specification.

For a fuller understanding of the nature and objects of the invention, reference may be had to the following detailed description taken in connection with the accompanying drawings, in which:

FIG. 3 shows idealized voltage-time waveforms for the circuit shown in FIG. 2;

FIG. 5 shows voltage-time waveforms illustrating the feedback principle shown in FIG. 4.

Figure 1:
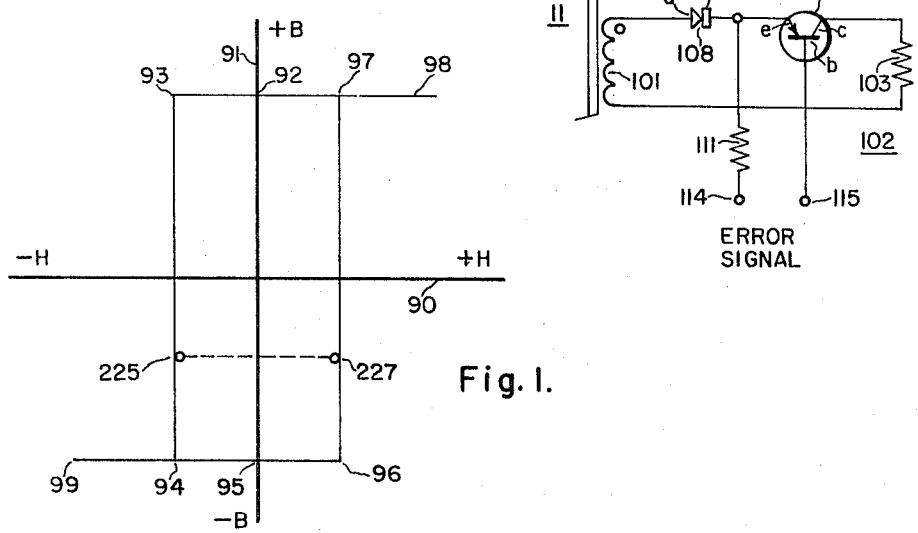
FIGURE 1 is a graphic diagram of the ideal hysteresis loop for the magnetic saturable cores used in the invention.

FIGURE 1 shows an ideal hysteresis loop for magnetic core material suitable for magnetic saturable core reactors used in the invention. The magnetizing force H is plotted along the abscissa 90 and the flux density B is plotted along the ordinate 91. Point 92 represents the retained flux density. When the current in the winding of a saturable core reactor increases from zero in one direction, the magnetizing force applied to the core will move from point 92 to points 93 and 94 and the core saturation line 99. As the current returns to zero, the magnetizing force will move to point 95. When the current then starts to increase in the opposite direction, the magnetizing force moves to point 96 and then reaches the opposite polarity saturation line 98 at point 97. When the current alternation returns to zero, the magnetizing force returns to point 92.

Figure 2:
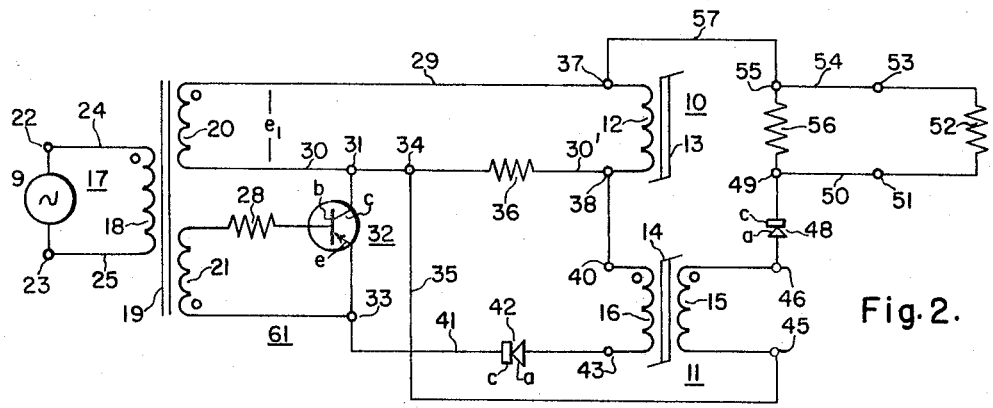
FIG. 2 is a schematic diagram of a circuit illustrating the principles of the invention.

Referring to FIG. 2, the regulated power supply comprises, in general, input terminals 22 and 23, output terminals 51 and 53, transformer 17, and saturable core reactors 10 and 11. The input terminals 22 and 23 are connected to a source of alternating current potential 9 which may vary considerably in magnitude. The output terminals 51 and 53 may be connected to a load 52, or may be used to supply a reference signal to other switching devices which may provide the regulated direct current output at a higher power level. To supply the proper alternating current voltages to the circuit elements, a transformer 17 may be used. The transformer 17 includes windings 18, 20, and 21 disposed in inductive relationship with the magnetic core 19.

The saturable core reactor 10 includes winding 12 disposed in inductive relationship with a magnetic core 13. The saturable core reactor 11 includes windings 15 and 16 having a like number of turns, disposed in an inductive relationship with magnetic core 14. The magnetic cores 13 and 14 should be constructed of square loop material such as Hypernik V.

The primary winding 18 of transformer 17 is connected to the alternating current source 9 at input terminals 22 and 23 by lines 24 and 25, respectively. Secondary winding 20 of transformer 17 is connected in series circuit relation with saturable core reactor 10 and resistor 36. More specifically, one side of secondary winding 20 is connected to winding 12 of saturable core reactor 10 at point 37 by line 29. The remaining side of secondary winding 20 is connected to one side of resistor 36 at point 34 by line 30. The other side of resistor 36 is connected to winding 12 of saturable core reactor 10 at point 38 by line 30'.

Secondary winding 21 of transformer 17 supplies power to a switching circuit 61, which may use a semiconductor device, such as a transistor 32, as a switching device.

Junction transistor 32 which, in this instance is of the PNP type, but may be of the NPN type, has a base electrode b, emitter electrode e, and collector electrode c. One side of secondary winding 21 of transformer 17 is connected to resistor 28 and the other side of resistor 28 is connected to the base electrode b of transistor 32. The remaining side of secondary winding 21 of transformer 17 is connected to the emitter electrode e of transistor 32 at point 33.

The emitter-collector circuit of transistor 32 is connected in series circuit relation with winding 16 of magnetic saturable core reactor 11 and rectifying device 42. More specifically, the collector electrode c of transistor 32 is connected to junction 31 between one side of secondary winding 20 and resistor 36. The emitter electrode e of transistor 32 is connected to rectifying device 42, which may be a semiconductor diode having a cathode c and an anode a. The emitter electrode e is connected to the cathode c of semiconductor diode 42 by line 41.

Rectifying device 42 is connected from one side of winding 21 of transformer 17 at junction 33 and to one side of winding 16 of saturable core reactor 11 at point 43. More specifically, the anode $a$ of semiconductor diode 42 is connected to point 43 and the cathode $c$ is connected to junction 33.

The remaining side of winding 16 of magnetic saturable core reactor 11 is connected to junction 38 between one side of the winding 12 of saturable core reactor 10 and one side of resistor 36.

The winding 15 of saturable core reactor 11 is connected in series-circuit relation with rectifying device 48 and resistor 56. The rectifying device 48 may be a semiconductor diode having an anode $a$ and a cathode $c$. More specifically, one side of winding 15 of saturable core reactor 11 is connected to point 34 by line 35. The other side of winding 15 of saturable core reactor 11 is connected to the anode $a$ of semiconductor diode 48, and the cathode $c$ of semiconductor diode 48 is connected to one side of resistor 56. The other side of resistor 56 is connected by conductor 57 to junction 37 between one side of secondary winding 20 of transformer 17 and one side of winding 12 of saturable core reactor 10.

The output terminals 51 and 53 are connected across resistor 56, with terminal 53 being connected to point 55 by line 54 and terminal 51 being connected to point 49 by line 50.

In describing the operation of the circuit shown in FIG. 2, reference will be made to the waveforms shown in FIG. 3 and the hysteresis loop shown in FIG. 1.

First, assume that the saturable core reactors 10 and 11 are at positive saturation flux density, represented by line 98 in FIG. 1, and that the voltage $e_1$ across the secondary winding 20 of transformer 17 has just changed from instantaneously negative to positive. It is a characteristic of magnetic saturable core reactors to reach saturation in a definite voltage-time relationship. When the voltage is increased across a saturable core reactor, saturation occurs in a shorter period of time. Conversely, when voltage is decreased across the saturable core reactor, saturation takes a correspondingly longer time to occur. This volt-second product is constant for any given saturable core reactor. When voltage $e_1$ across the secondary winding 20 of transformer 17 starts to increase from zero in a positive direction, this voltage will be impressed across winding 12 of magnetic saturable core reactor 10. The voltage $e_1$ will be sustained by winding 12 of magnetic saturable core reactor 10 for a definite volt-second product, as the flux density changes from positive saturation flux density, line 98 of FIG. 1, to negative saturation flux density, line 99 of FIG. 1. This voltage build-up across saturable core reactor 10 is graphically shown in FIG. 3A, with negative saturation occurring at point 71.

As the voltage $e_1$ increases from point 70 to point 71 as shown in FIG. 3A, the small amount of magnetizing current allowed to flow will produce only a small voltage drop across resistor 36. When saturable core reactor 10 saturates, it no longer presents a high impedance in the circuit, and substantially all of the voltage $e_1$ for the remaining portion of the positive half cycle, will appear across the resistor 36, as graphically shown in FIG. 3B, from points 71 to 75, and, therefore, across winding 16 of saturable core reactor 11. Winding 16 of saturable core reactor 11 will sustain the remaining volt-second product of the positive half cycle of voltage $e_1$ by a change in its flux density from positive saturation, line 98 of FIG. 1 towards negative saturation, line 99 of FIG. 1. This is graphically shown in FIG. 3C, with the voltage impressed upon winding 16 of saturable core reactor 11 beginning at point 71 and ending at point 75. Saturable core reactor 11 must not reach negative saturation, as will be hereinafter explained; therefore, the maximum voltage $e_1$ must not exceed a voltage that would drive saturable core reactor 11 to the negative saturation line 99 in FIG. 1.

During the positive half cycle of voltage $e_1$, there is no current flow in winding 15 of saturable core reactor 11. This is because windings 16 and 15 of saturable core reactor 11 have a like number of turns, making the voltage at point 37 more positive than the voltage at point 46 by the amount of the voltage drop across saturable core reactor 10. Any current flow, therefore, would try to flow in the blocking direction of semiconductor diode 48.

During the positive half cycle of voltage $e_1$, the switching transistor 32 is saturated and allows current to flow through winding 16 of saturable core reactor 11. More specifically, during the positive half cycle of voltage $e_1$, the base electrode $b$ of PNP transistor 32 is negative with respect to the emitter electrode $e$, therefore allowing current to flow from the emitter electrode $e$ to the collector electrode $c$. Since the rectifier 42 will not block current flowing from junction 38 through winding 16 of magnetic saturable core reactor 11 to junction 31, and since the transistor 32 will conduct current from emitter electrode $e$ to collector electrode $c$, current will flow through winding 16 of magnetic saturable core reactor 11 during the time the portion of the positive half cycle of voltage $e_1$ is impressed upon it.

When voltage $e_1$ becomes negative, as illustrated by point 75 on the waveform in FIG. 3A, winding 12 of magnetic saturable core reactor 10 will again sustain voltage $e_1$ for its volt-second product characteristic and will reach saturation at point 77 of FIG. 3A. Upon saturation of magnetic saturable core reactor 10, most of the remaining half cycle of voltage $e_1$ will be transferred to resistor 36, as shown in FIG. 3B, points 77 to 79.

When voltage $e_1$ becomes negative, rectifying device or diode 42 will prevent current flow through winding 16 from point 43 to point 40 of saturable core reactor 11, as this current flow would be against the blocking action of diode 42. Also, the PNP transistor 32 will prevent current flow through winding 16 of saturable core reactor 11 in the direction from points 40 to 43 due to the induced voltage from winding 15, as the base electrode $b$ is positive with respect to the emitter electrode $e$ during the negative half cycle of voltage $e_1$, and transistor 32 will not conduct. Rectifier 42 has been included in the circuit only as a precaution, and may be eliminated if desired. The tendency of current flow through winding 16 of saturable core reactor 11, on either the positive or negative half cycles of voltage $e_1$, is in the conducting direction of rectifier 42. Therefore, the action of transistor 32, blocking current flow through winding 16 from points 38 to 31 during the negative half cycle of voltage $e_1$, would be sufficient. However, because it is essential that there is no current flow through winding 16 during the negative half cycle of voltage $e_1$, the diode 42 has been included in the circuit to preclude the possibility of a change in circuit parameters causing current to flow through winding 16 in a direction from points 31 to 38.

The negative half cycle of voltage $e_1$ will be impressed directly upon winding 15 of saturable core reactor 11, because of the connection of winding 15 to the secondary winding 20 of transformer 17 by line 35. Winding 15 of saturable core reactor 11 will sustain voltage $e_1$ for a volt-second product substantially equal to that sustained by winding 16 of saturable core reactor 11 during the positive half cycle of voltage $e_1$, as shown in the waveforms of FIGS. 3C and 3D. The core 14 of saturable core reactor 11 will then saturate, with the voltage waveform across winding 15 of saturable core reactor 11 being shown in FIG. 3D from points 75 to 78. As pointed out earlier, saturable core reactor 11 must not reach negative saturation when the portion of the positive half cycle of voltage $e_1$, remaining after saturation of saturable core reactor 10, is impressed upon it. In other words, the magnetic core 14 of saturable core reactor 11 is driven along the line from point 93 towards point 94, on the hysteresis curve shown in FIG. 1, but the positive half cycle voltage $e_1$ reaches zero voltage before the magnetic core 14 reaches the negative saturation point 94. The point actually reached may be characterized by point 225 of FIG. 1. Then, since the negative half cycle of voltage $e_1$ is impressed upon winding 15 of saturable core reactor 11 immediately, the magnetic core 14 is driven to points 227 and 97 and the positive saturation line 98. The volt-second product required to drive the magnetic core 14 from point 225 back to the positive saturation line 98 is substantially equal to the volt-second product required to drive magnetic core 14 from positive saturation line 98 to point 225. Therefore, the volt-second product sustained by winding 16 and magnetic core 14 of saturable core reactor 11 substantially equals the volt-second product sustained by winding 15 and magnetic core 14 of saturable core reactor 11, and the area under the curve shown in FIG. 3C is substantially equal to the area under the curve shown in FIG. 3D.

When the magnetic core 14 of saturable core reactor 11 saturates, the remaining portion of the negative half cycle of voltage $e_1$ will appear across resistor 56. The voltage waveform across resistor 56 is shown in FIG. 3E. Since the volt-second product sustained by winding 15 of saturable core reactor 11 during the negative half cycle of voltage $e_1$, as shown in FIG. 3D, substantially equals the volt-second product sustained by winding 16 of saturable core reactor 11 during the positive half cycle of voltage $e_1$, as shown in FIG. 3C, the voltage waveform appearing across resistor 56, shown in FIG. 3E from points 78 to 79, will be substantially equal to the voltage waveform shown in FIG. 3A from points 70 to 71. The output voltage is taken across resistor 56 at points 49 and 55. This output voltage, as shown in FIG. 3E, has a wave shape of part of a sine wave, starting during a half cycle and ending at input voltage zero. In other words, the constant volt-second area of FIG. 3A starting at the beginning of the positive half cycle has been transferred to the end of the negative half cycle, thus giving a constant voltage output having a steep wave front which may be used to trigger or fire higher power devices.

The volt-second integral of the output voltage across the resistor 56 is the same as the volt-second integral of voltage sustained by saturable core reactor 10 before saturation. Therefore, the output voltage is always a constant, determined by the volt-second characteristic of saturable core reactor 10, and will not be affected by considerable changes in the magnitude of the alternating potential source 9.

Figure 4:
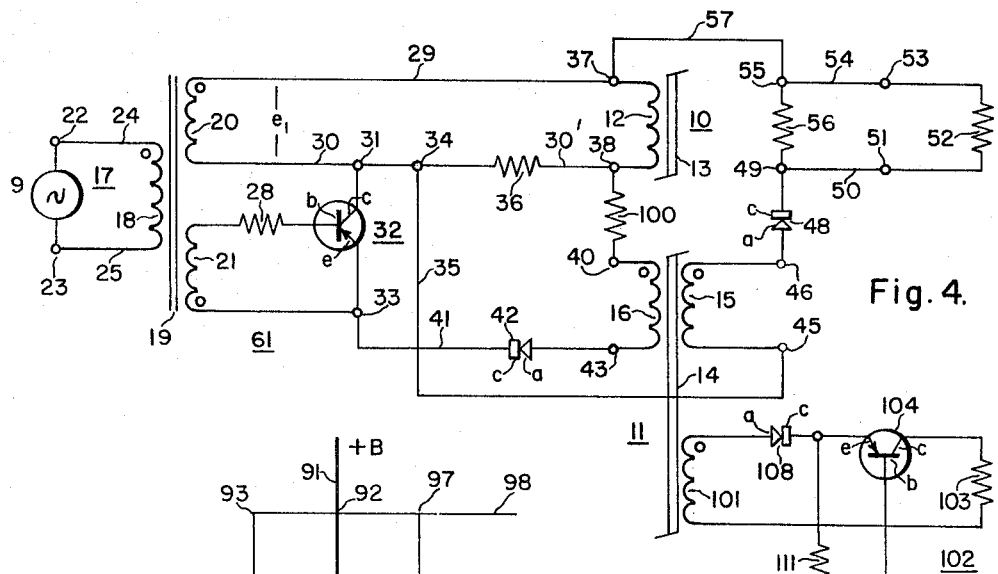
FIG. 4 shows a modification of the circuit of FIG. 2 adding a feedback circuit.

The basic static regulating device shown in FIG. 2 produces a regulated output voltage by an open-ended system that is fast and stable and relatively accurate. If a closer accuracy is required, however, any one of a number of feedback methods may be used. For example, FIG. 4 shows the basic circuit of FIG. 1 modified with a simple feedback arrangement 102 that may be used. With this arrangement, a resistor 100 is added between winding 16 of saturable core reactor 11 and one end of winding 12 of saturable core reactor 10. This is accomplished by connecting one side of the resistor 100 to point 40 and the other side to point 38. Also, another winding 101 is disposed in inductive relationship with magnetic core 14 of saturable core reactor 11. The winding 101 is connected in series circuit relation with a resistor 103, a rectifying device 108, which may be a semiconductor diode having an anode $a$ and a cathode $c$, and a variable impedance device which may be PNP junction type transistor 104 having a base electrode $b$, emitter electrode $e$ and a collector electrode $c$.

More specifically, one end of winding 101 of saturable core reactor 11 is connected to the anode $a$ of semiconductor diode 108 and the cathode $c$ is connected to the emitter electrode $e$ of transistor 104. The collector electrode $c$ of transistor 104 is connected to one side of resistor 103 and the other side of resistor 103 is connected to the remaining side of winding 101 of saturable core reactor 11. An error signal derived by any conventional means is introduced to the feedback circuit 102 through terminals 114 and 115. Terminal 114 is connected to one side of resistor 111 and the other side of resistor 111 is connected between the cathode $c$ of the rectifier 108 and the emitter electrode $e$ of transistor 104. Terminal 115 is connected to the base electrode $b$ of transistor 104.

In operation, the rectifying device or semiconductor diode 108 will allow current to flow in winding 101 of saturable core reactor 11 during the positive half cycle of voltage $e_1$. This is the same half cycle of voltage $e_1$ that current is allowed to flow in winding 16 of saturable core reactor 11, which now has resistor 100 connected in series-circuit relation with it. The magnitude of the current permitted to flow through winding 101 of saturable core reactor 11 during the positive half cycle of voltage $e_1$ will depend upon the magnitude of the error signal applied to the terminals 114 and 115. This error signal, applied to the emitter electrode $e$ and base electrode $b$ of transistor 104 will change the impedance of transistor 104 and allow more or less current to flow, depending upon the value of error signal voltage. Current flowing in winding 101 of saturable core reactor 11 will cause more current to flow through winding 16 of saturable core reactor 11, as it is in effect, applying a load to winding 16. This increase in current through winding 16 of saturable core reactor 11, will cause a voltage drop across resistor 100 which will reduce the voltage applied to winding 16 of saturable core reactor 11. It, therefore, appears to the circuit that the magnitude of voltage $e_1$ has been reduced, and on the next half cycle, the output voltage across resistor 56 will be increased. This is shown graphically in FIG. 5. More specifically, the positive half cycle of voltage $e_1$ is sustained across winding 12 of saturable core reactor 10 until saturation of the magnetic core 13 occurs. This is demonstrated by points 120 and 121 on the waveform shown in FIG. 5A, with saturation occurring at point 121. The remaining portion of the positive half cycle of voltage $e_1$ is then transferred to winding 16 of saturable core reactor 11. The magnitude of current allowed to flow through winding 16 of saturable core reactor 11 will depend upon the magnitude of the current allowed to flow in winding 101 of saturable core reactor 11. This, in turn, depends upon the magnitude of the error signal voltage applied to terminals 114 and 115. If an error signal voltage allows current to flow in winding 101 of saturable core reactor 11, a greater current than normal will flow in winding 16 of saturable core reactor 11, causing a greater voltage drop across resistor 100. The voltage drop across resistor 100 reduces the voltage applied to winding 16 of saturable core reactor 11 and instead of the voltage waveform tracing the path 121 to 123 as shown in FIG. 5B, it will trace a path as represented by points 122 to 123. The area under the latter curve is less than normal and the area under the voltage curve for winding 15 of saturable core reactor 11 will be less, as evidenced by FIG. 5C. This is true because the volt-second integral, or area under the waveform shown in FIG. 5C, of the voltage sustained by winding 15 during the negative half cycle of saturable core reactor 11 substantially equals the volt-second integral of the voltage across winding 16 during the positive half cycle of voltage $e_1$, as hereinbefore explained. Since the portion of the half cycle remaining after saturation of saturable core reactor 11 is the output voltage appearing across resistor 56, as traced by points 126–128 on the waveform shown in FIG. 5D, it will necessarily be greater than if a lesser value of current had been flowing in winding 101 of saturable core reactor 11. Therefore, the output voltage across resistor 56 may be varied up or down according to the error signal voltage applied to transistor 104, which is used as a variable impedance in series with winding 101 of saturable core reactor 11.

Figure 6:
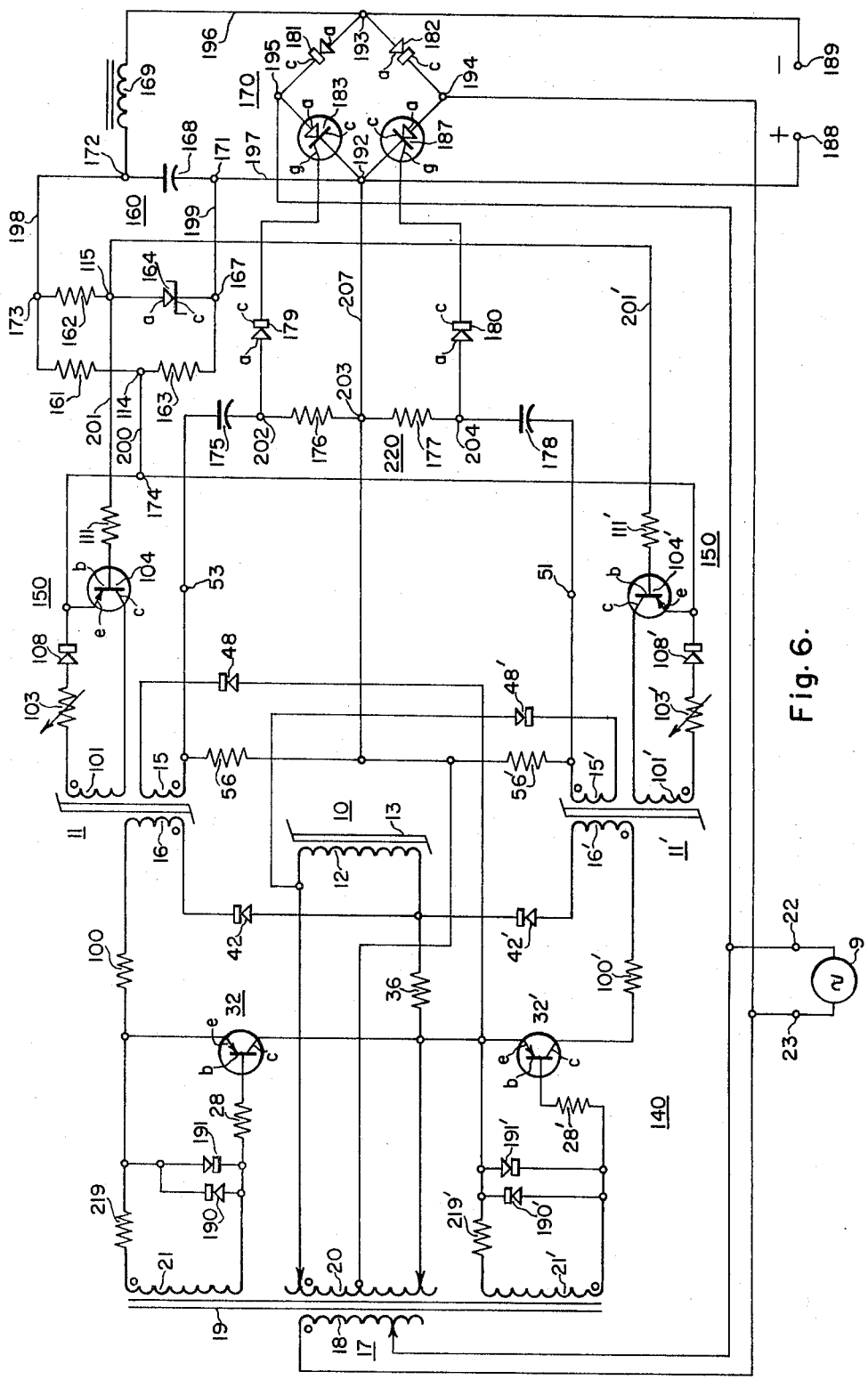
FIG. 6 is a schematic diagram illustrating the invention extended to a full-wave circuit with feedback control and a power output stage.

FIG. 6 illustrates the basic circuit as shown in FIG. 2, extended to a full-wave output, including the feedback circuit shown in FIG. 4 and the addition of a higher power output stage that may be used.

In general, the system shown in FIG. 6 comprises an alternating potential source 9 connected to input terminals 22 and 23, the basic circuit 140, the feedback circuit 150, an error sensing circuit 160, a pulse shaping circuit 220, a power output stage 170, and unidirectional voltage output terminals 188 and 189.

The basic circuit 140 and feedback circuits 150, although extended to a full-wave output, function in a manner similar to that previously described, with like components designated with like reference numerals in all the various figures. With the full-wave output, however, instead of the windings 15 and 16 of saturable core reactor 11 having the same number of turns, winding 16 will have substantially twice the number of turns of winding 15, and winding 16' will have substantially twice the number of turns of winding 15'. Also, diodes 190, 191, 190' and 191' and resistors 219 and 219' have been added to limit the voltage applied to the base electrodes $b$ of transistors 32 and 32'.

The error sensing circuit 160 may be a well known bridge network comprising resistors 161, 162 and 163 in three of the bridge legs, and a voltage reference device 164 in the remaining leg. More specifically, the direct current output voltage is monitored by lines 196 and 197 connected to junctions 192 and 193, which are in turn connected to unidirectional voltage output terminals 188 and 189. This full-wave rectified output voltage is filtered by a waveform filter comprising choke coil 169 and capacitor 168 and then applied to the error sensing circuit 160. The choke coil 169 is connected in series circuit relation with line 196 between points 172 and 193, and capacitor 168 is connected between points 171 and 172. Line 198, connected between points 173 and 172, joins one side of the filtered unidirectional voltage to the bridge circuit 160. Line 199, connected between points 167 and 171, joins the other side of the filtered unidirectional voltage to the bridge circuit 160.

Resistor 161, in one of the legs of sensing or bridge circuit 160, is connected between points 114 and 173. Resistor 162, in another leg of the bridge circuit, is connected between points 115 and 173. Resistor 163, in still another leg of the bridge circuit, is connected between points 114 and 167. A voltage reference device 164, such as a Zener diode having an anode $a$ and a cathode $c$, is connected in the remaining leg of the bridge circuit between points 115 and 167.

In order to apply the error signal from the sensing circuit 160 to the feedback circuit 150, line 200 is connected from sensing circuit 160 at point 114 to the junction 174 between the emitter electrodes $e$ of transistors 104 and 104'. Further, lines 201 and 201' are connected from the sensing circuit 160 at point 115 to the base electrodes $b$ of transistors 104 and 104' through resistors 111 and 111'.

Zener diode 164 is placed in the bridge circuit 160 so that the current tends to flow in its current blocking direction, or from point 167 to point 115. The current-voltage relationship of Zener diodes, in their normally non-conductive direction, has a sharp bend or knee at a voltage point called the avalanche or Zener voltage. When the Zener voltage is exceeded, the voltage drop across the diode is substantially constant. This characteristic of the Zener diode may be used as a reference in a bridge arrangement to produce an error or deviation voltage when the voltage to be regulated goes above or below a desired voltage. As the output voltage varies, the voltage drop across Zener diode 164 remains constant, so the entire voltage change appears across resistor 162. The voltage drop across resistors 161 and 163 is shared proportionately, so an error signal voltage is produced at terminals 114 and 115. Voltage taps may be selected on transformer 17 or on saturable core reactor 10 to permit adjustment of the basic output voltage. Bridge circuit 160 should be adjusted so that a current is allowed to flow through transistor 104 that is near the middle of the control range. Then an increase or decrease in current through transistor 104 will raise or lower the output voltage as required, without driving the transistor 104 to cutoff or saturation.

The output of the basic circuit 140, as controlled by the feedback circuits 150 and 150', is delivered to terminals 51 and 53. This output, as described previously, is a portion of a sine wave having a steep wave front, in phase with the input voltage, starting during a half cycle, and ending at input voltage zero. This output voltage is shaped into a pulse by network 220 comprising resistors 176 and 177, and capacitors 175 and 178. More specifically, basic circuit output terminal 51 is connected to one side of capacitor 178, and the other side of capacitor 178 is connected to resistor 177 at junction 204. In like manner, output terminal 53 is connected to one side of capacitor 175, and the other side of capacitor 175 is connected to resistor 176 at junction 202. The two resistors 176 and 177 are connected together at junction 203, and junction 203 is connected to bridge circuit 170 at point 192 by line 207. The other connection to the bridge circuit 170 from the output of basic circuit 140 is accomplished through rectifying devices 179 and 180, which may be semiconductor diodes each having a cathode $c$ and an anode $a$. Semiconductor diode 179 has its anode $a$ connected to junction 202 and its cathode $c$ is connected to the bridge circuit 170. Rectifier 180 has its anode $a$ connected to junction 204 and its cathode $c$ is connected to the bridge circuit 170.

The bridge circuit 170 includes rectifying devices 181 and 182 which may be semiconductor diodes each having a cathode $c$ and an anode $a$, and semiconductor controlled rectifiers 183 and 187 each having a cathode $c$, anode $a$, and gate electrode $g$, connected in a single phase full-wave bridge arrangement. The gate electrodes $g$ of controlled rectifiers 183 and 187 are connected to the cathodes $c$ of semiconductor diodes 179 and 180, respectively. The cathodes $c$ of semiconductor controlled rectifiers 183 and 187 are connected together at point 192. The anode $a$ of controlled rectifier 183 is connected to the cathode $c$ of semiconductor diode 181 and one side of the alternating potential source 9 at point 195. The anode $a$ of controlled rectifier 187 is connected to the cathode $c$ of semiconductor diode 182 and the other side of the alternating current source voltage 9 at point 194. The anodes $a$ of semiconductor diodes 181 and 182 are connected to point 193, which is in turn connected to direct current output terminal 189. The other direct current output terminal 188 is connected to the bridge circuit 170 at point 192.

In operation, the semiconductor controlled rectifiers 183 and 187 will not conduct until a control or signal pulse is applied to their gate electrodes $g$. Once conduction has been initiated by such a pulse, the gate electrodes $g$ no longer have any control over the conduction of the semiconductor controlled rectifiers 183 and 187. To stop conduction, the anode-cathode current must be reduced to a value less than the holding current, which is near zero. Since the control pulse is in phase with the alternating current source, and the control pulse starts during a half cycle and ends at input voltage zero, the semiconductor controlled rectifiers 183 and 187 may be made to conduct at any desired point along the sine wave of the input voltage, and control by the gate electrodes $g$ will be resumed at input voltage zero. It can, therefore, be seen that the unidirectional output voltage may be varied, depending upon the particular time location in the sine wave the controlled rectifiers 183 and 187 are fired.

In summary, the basic circuit 140 produces a voltage output having a steep wave front which is determined by the volt-second saturation characteristic of saturable core reactor 10. The output is thus independent of, and not affected by changes in the alternating current source over a wide range. To produce a close accuracy, feedback circuit 150 is employed which derives its signal from sensing circuit 160 that is monitoring the unidirectional output voltage. To produce a higher power output than is capable with basic circuit 140 alone, the output of the basic circuit 140 is shaped into a pulse by resistor-capacitor network 220. This pulse is used to control the firing point of higher power devices, such as semiconductor controlled rectifiers 183 and 187, as illustrated in arrangement 170. By varying the firing point of the controlled rectifiers, the output voltage may be maintained through fluctuations in load, and as already pointed out, variations in the alternating current supply voltage do not affect the output voltage.

It will, therefore, be apparent that there has been disclosed a new and improved static power supply that will provide a constant output independent of variations in the alternating current supply voltage or load, and that will provide unidirectional output pulses having a steep wave front in phase with the input voltage which may be utilized directly or as a signal for control of higher power output devices.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. An electrical circuit comprising a source of alternating potential, first saturable magnetic core means having a winding, second saturable magnetic core means having first and second windings, first and second impedance means, first and second asymmetrically conductive means, the winding of said first saturable magnetic core means and said first impedance means being serially connected across said source of alternating potential, the first winding of said second saturable magnetic core means and said first asymmetrically conductive device being serially connected across said first impedance means, the second winding of said second saturable magnetic core means, said second asymmetrically conductive means, and said second impedance means being serially connected across said source of alternating potential, said first and second asymmetrically conductive devices being poled to allow current flow through the first and second windings of said second saturable magnetic core means on opposite polarity voltage half cycles of said source of alternating potential, said source of alternating potential having a minimum magnitude large enough to drive said first saturable magnetic core means from one saturation point to the other during a voltage half cycle of said source of alternating potential, and a maximum magnitude which will drive said second saturable magnetic core means only partially from one saturation point to the other, the portion of the voltage half cycle of said alternating potential remaining after saturation of said first saturable magnetic core means being applied to the first winding of said second saturable magnetic core means, driving said second saturable magnetic core means from one saturation point towards the other on voltage half cycles in which current is allowed to flow by said first asymmetrically conductive means, the current flow through the second winding of said second saturable magnetic core means on the succeeding voltage half cycle driving said second saturable magnetic core means back to said one saturation point, the portion of the half cycle remaining after saturation of said second saturable magnetic core means being applied to said second impedance means.

2. An electrical circuit comprising a source of alternating potential, first impedance means, first saturable magnetic core means having a winding, said first impedance means and the winding of said first saturable magnetic core means being serially connected across said source of alternating potential, second saturable magnetic core means having first and second windings, the first winding of said second saturable magnetic core means being connected across said first impedance means, second impedance means, said second impedance means and the second winding of said second saturable magnetic core means being serially connected across said source of alternating potential, said first saturable magnetic core means reaching saturation during the first half cycle of said alternating potential, the portion of the first half cycle of said alternating potential remaining after saturation of said first saturable magnetic core means being applied to the first winding of said second saturable magnetic core means, causing current flow through said second saturable magnetic core means which drives it from one saturation point towards the opposite saturation paint, means preventing current flow through the second winding of said second saturable magnetic core means during the first half cycle of said source of alternating potential, the second half cycle of said alternating potential causing current flow through the second winding of said second saturable magnetic core means, driving said second saturable magnetic core means back to its starting saturation point, means preventing current flow through the first winding of said second saturable magnetic core means during the second half cycle of said source of alternating potential, the portion of said second half cycle of said alternating potential remaining after saturation of said second saturable magnetic core means being applied to said second impedance means.

3. An electrical circuit comprising input means connected in circuit relation with a source of alternating potential, output means connected in circuit relation with a load circuit, first magnetic means having a winding, impedance means, said impedance means and the winding of said first magnetic means being serially connected across said input means, second magnetic means having a first winding connected across said impedance means, said second magnetic means having a second winding serially connected with said output means across said imput means, means allowing current flow through the first winding of said second magnetic core means only on the first half cycle of said source of alternating potential, means allowing current flow through the second winding of said second magnetic core means only on the second half cycle of said source of alternating potential, said first magnetic means reaching saturation before completion of the first half cycle of said alternating potential, the portion of the first half cycle of said alternating potential remaining after saturation of said first magnetic means being applied to the first winding of said second magnetic means, causing current flow which drives said second magnetic means from one saturation point towards the opposite saturation point, the second half cycle of said alternating potential causing current flow in the second winding of said second magnetic means which drives said second magnetic means back to its starting saturation point, the portion of the second half cycle of said alternating potential remaining after saturation of said second magnetic means being applied to said output means.

4. An electrical circuit having input terminals connected in circuit relation with a source of alternating potential and output terminals connected in circuit relation with a load circuit, comprising first impedance means, first saturable core reactor means having a winding serially connected with said first impedance means across said input terminals, second saturable core reactor means having first and second windings, the first winding of said second saturable core reactor means being connected across said first impedance means, second impedance means connected across said output terminals, the second winding of said second saturable core reactor means being serially connected with said second impedance means across said input terminals, said first saturable core reactor means reaching saturation before completion of the first half cycle of said alternating potential source, the portion of the first half cycle of said alternating potential remaining after saturation of said first saturable core reactor means being applied to said first impedance means and the first winding of said second saturable core reactor, driving said second saturable core reactor means from one saturation point towards the opposite saturation point, means preventing current flow through the second winding of said second saturable core reactor means during the first half cycle of said alternating potential, the second half cycle of said alternating potential causing current flow in the second winding of said second saturable core reactor means, driving said second saturable core reactor means back to its starting saturation point, means preventing current flow through the first winding of said second saturable core reactor means during the second half cycle of said alternating potential source, the portion of the second half cycle of said alternating potential remaining after saturation of said second saturable core reactor means being applied to said second impedance means and said output terminals.

5. An electric circuit for producing a regulated unidirectional output voltage, comprising input means connected in circuit relation with a source of alternating potential, output means connected in circuit relation with a load circuit, impedance means, first magnetic means having a winding serially connected with said impedance means across said input means, second magnetic means having first, second and third windings, means producing an error signal proportional to the deviation of the output voltage of said electric circuit from the desired voltage, the first winding of said second magnetic means being connected across said impedance means, the second winding of said second magnetic means being serially connected with said output means across said input means, said first magnetic means reaching saturation before completion of the first half cycle of said alternating potential, the portion of the first half cycle of said alternating potential remaining after saturation of said first magnetic means being applied to the first winding of said second magnetic means, causing a current flow which drives said second magnetic means from one saturation point toward the opposite saturation point, the second half cycle of said alternating potential causing current flow in the second winding of said second magnetic means, driving said second magnetic means back to its starting saturation point, the portion of the second half cycle of said alternating potential remaining after saturation of said second magnetic means being applied to said output means, and means responsive to said error signal producing means connected to vary the current flow in the third winding of said second magnetic means in response to said error signal, regulating the portion of the said second half cycle of said alternating potential being applied to said output means.

6. A voltage regulated power supply having input terminals connected in circuit relation with a source of alternating potential and output terminals connected in circuit relation with a load circuit comprising, first impedance means, first saturable core reactor means having a winding serially connected with said first impedance means across said input terminals, second saturable core reactor means having first, second and third windings, the first winding of said second saturable core reactor means being connected across said first impedance means, second impedance means connected across said output terminals, the second winding of said second saturable core reactor means being serially connected with said second impedance means across said input terminals, error sensing means connected across said output terminals, providing an error signal proportional to the deviation of the output voltage from the desired value, transistor means connected to vary the magnitude of current flow in the third winding of said second saturable core reactor means, said error sensing means being connected to vary the impedance of said transistor means in response to said error signal, said first saturable core reactor means reaching saturation before completion of the first half cycle of said source of alternating potential, the portion of the first half cycle of said alternating potential remaining after saturation of said first saturable core reactor means being applied to said first impedance means and the first winding of said second saturable core reactor means, causing a current flow which drives said second saturable core reactor means from one saturation point towards the opposite saturation point, means preventing current flow through the second winding of said second saturable core reactor means during the first half cycle of said source of alternating potential, the second half cycle of said source of alternating potential causing current flow in the second winding of said second saturable core reactor which drives said second saturable core reactor back to its starting saturation point, means preventing current flow through the first winding of said second saturable core reactor during the second half cycle of said source of alternating potential, the portion of the second half cycle of said source of alternating potential remaining after saturation of said second saturable core reactor means being applied to said second impedance means and said output terminals, means preventing current flow through the third winding of said second saturable core reactor means during the second half cycle of said alternating potential, the third winding of said second saturable core reactor means varying the magnitude of the portion of said alternating potential applied to said output terminals, in response to the error signal from said error sensing means.

7. The voltage regulated power supply of claim 6 including amplifying means, and means connecting said output terminals to said amplifying means.

No references cited.

JOHN F. COUCH, *Primary Examiner.*

M. L. WACHTELL, *Examiner.*